US008785522B2

(12) United States Patent
Yano et al.

(10) Patent No.: US 8,785,522 B2
(45) Date of Patent: Jul. 22, 2014

(54) LOW-PERMITTIVITY RESIN COMPOSITION

(75) Inventors: Toshihiro Yano, Wakayama (JP); Masaki Komatsu, Wakayama (JP)

(73) Assignee: Kao Corporation, Tokyo (JP)

( * ) Notice: Subject to any disclaimer, the term of this patent is extended or adjusted under 35 U.S.C. 154(b) by 206 days.

(21) Appl. No.: 13/383,698

(22) PCT Filed: Jul. 6, 2010

(86) PCT No.: PCT/JP2010/061475
§ 371 (c)(1),
(2), (4) Date: Jan. 12, 2012

(87) PCT Pub. No.: WO2011/007698
PCT Pub. Date: Jan. 20, 2011

(65) Prior Publication Data
US 2012/0123021 A1    May 17, 2012

(30) Foreign Application Priority Data

Jul. 14, 2009   (JP) ................................. 2009-165257
Apr. 21, 2010   (JP) ................................. 2010-098089

(51) Int. Cl.
  *C08J 9/32*    (2006.01)
(52) U.S. Cl.
  USPC ......................................... 523/218; 524/493
(58) Field of Classification Search
  USPC ......................................... 523/218; 524/493
  See application file for complete search history.

(56) References Cited

U.S. PATENT DOCUMENTS

| 5,098,781 A | 3/1992 | Minnick et al. |
| 2009/0030134 A1 | 1/2009 | Sasaki et al. |

FOREIGN PATENT DOCUMENTS

| CN | 101233795 A | 7/2008 |
| JP | 2001-226171 A | 8/2001 |
| JP | 2003-086676 A | 3/2003 |
| JP | 2005-167266 A | 6/2005 |
| JP | 2005 206436 | 8/2005 |
| JP | 2006 62902 | 3/2006 |
| JP | 2008-031409 A | 2/2008 |
| JP | 2009 62403 | 3/2009 |
| JP | 2009-203115 | 9/2009 |
| JP | 2010 37150 | 2/2010 |
| JP | 2011-21068 | 2/2011 |
| WO | 2007 125891 | 11/2007 |
| WO | 2008 111393 | 9/2008 |
| WO | WO 2009/110514 A1 | 9/2009 |

OTHER PUBLICATIONS

Combined Chinese Office Action and Search Report Issued Jun. 28, 2013 in Patent Application No. 201080031909.3 (with English translation of Categories of Cited Documents).
International Search Report Issued Aug. 17, 2010 in PCT/JP10/61475 Filed Jul. 6, 2010.
Japanese Office action issued Oct. 22, 2013, in Japan Patent application No. 2010-098089.
Combined Chinese Office Action and Search Report issued Dec. 3, 2013 in Patent Application No. 201080031909.3.

*Primary Examiner* — Edward Cain
(74) *Attorney, Agent, or Firm* — Oblon, Spivak, McClelland, Maier & Neustadt, L.L.P.

(57) ABSTRACT

The present invention relates to a low-dielectric resin composition having sufficiently low dielectric constant and dissipation factor, a low-dielectric film formed of the low-dielectric resin composition, processes for producing the low-dielectric resin composition and the low-dielectric film, and a coating agent for low-dielectric films. According to the present invention, there are provided (1) a low-dielectric resin composition including hollow silica particles having an average particle size of from 0.05 to 3 μm and a BET specific surface area of less than 30 m²/g, and a matrix resin in which the hollow silica particles are dispersed; (2) a low-dielectric film including the low-dielectric resin composition; (3) a process for producing the low-dielectric resin composition which includes the steps of preparing hollow silica particles (A) containing air inside thereof or core/shell type silica particles (B) in which a material capable of being dissipated by calcination to form hollow portions therein is encapsulated; calcination the hollow silica particles (A) or the core/shell type silica particles (B) at a temperature higher than 950° C. to prepare hollow silica particles (C); and dispersing the hollow silica particles (C) in a matrix resin-forming material to prepare a dispersion of the particles; and (4) a coating agent for low-dielectric films including the hollow silica particles, and a matrix resin-forming material in which the hollow silica particles are dispersed.

22 Claims, No Drawings

LOW-PERMITTIVITY RESIN COMPOSITION

CROSS REFERENCES TO RELATED APPLICATIONS

This application is a 371 of International Patent Application No. PCT/JP10/061475, filed on Jul. 6, 2010, and claims priority to Japanese Patent Application No. 2009-165257, filed on Jul. 14, 2009, and Japanese Patent Application No. 2010-098089, filed on Apr. 21, 2010.

FIELD OF THE INVENTION

The present invention relates to low-dielectric resin compositions, low-dielectric films, and processes for producing the low-dielectric resin compositions and low-dielectric films, as well as coating agents for low-dielectric films.

BACKGROUND OF THE INVENTION

In recent years, electronic devices or equipments such as LSI which are used in CPU or memories have been more and more enhanced in performance characteristics, leading to increase in operating frequency and reduction in size of the apparatuses. On the other hand, there occur various extensive problems such as increased transmission loss owing to the increase in operating frequency, and prolonged delay time owing to fineness of circuit wirings.

To solve these problems, it has been demanded to develop low-dielectric constant and low-dissipation factor insulating materials used in a multilayer wiring structure of electronic circuits. In order to reduce a dielectric constant of a layer insulation film, studies have been made to introduce voids into the film. However, when voids having non-uniform sizes are introduced into the film to reduce its dielectric constant, there tends to occur such a problem that the resulting film is deteriorated in strength thereof.

Patent Document 1 discloses a process for producing a ceramic film such as a mesoporous silica film having a dielectric constant of 2 to 3 in which a film-forming liquid containing a ceramic precursor, a catalyst, a surfactant and a solvent is prepared, and the thus prepared film-forming liquid is applied onto a substrate to remove the solvent therefrom.

Patent Document 2 discloses a low-dielectric constant film formed of a porous material of an organic group-containing silicon oxide wherein the silicon oxide contains silicon atoms at least a part of which form carbon-to-silicon bonds with two or more positions of organic groups, and the porous material is a mesoporous material having a peak pore diameter of 1 to 30 nm.

However, in the methods described in Patent Documents 1 and 2, a calcination step is required to remove a surfactant used for formation of the films. Therefore, there tend to arise the problems such as limitation to the kind of substrate used therein which will be disadvantageous from the viewpoint of a versatility of materials, etc.

Also, Patent Document 3 discloses a process for producing a low-dielectric constant insulating film in which a solution containing fine particles having a bond of a silicon atom and an oxygen atom and containing holes, a resin and a solvent is applied onto a substrate to form a thin coating film thereon, and then the thus coated substrate is heated.

In addition, Patent Document 4 discloses a low-dielectric resin composition containing hollow particles and a thermosetting resin in which silica particles having an average porosity of 30 to 80% by volume and an average particle size of 0.1 to 20 μm are used as the hollow particles to reduce a dielectric constant and a dissipation factor of the composition, and a prepreg prepared by impregnating a substrate with the low-dielectric resin composition and then heating and drying the thus impregnated substrate.

However, in the methods described in Patent Documents 3 and 4, the obtained films, etc., are still unsatisfactory in dielectric constant and dissipation factor.
Patent Document 1: JP 2001-226171A
Patent Document 2: JP 2003-86676A
Patent Document 3: JP 2005-167266A
Patent Document 4: JP 2008-031409A

SUMMARY OF THE INVENTION

The present invention relates to the following aspects (1) to (6).
(1) A low-dielectric resin composition including hollow silica particles having an average particle size of from 0.05 to 3 μm and a BET specific surface area of less than 30 $m^2/g$, and a matrix resin in which the hollow silica particles are dispersed.
(2) A low-dielectric resin composition including hollow silica particles having an average particle size of from 0.05 to 1 μm with the proviso that 80% by mass or more of the whole particles have a particle size falling within the range of the average particle size ±30%, and a BET specific surface area of less than 30 $m^2/g$, and a matrix resin in which the hollow silica particles are dispersed.
(3) A low-dielectric resin composition including hollow silica particles having an average particle size of from 0.05 to 3 μm, a porosity of from 30 to 90% and a BET specific surface area of less than 30 $m^2/g$, and a matrix resin in which the hollow silica particles are dispersed.
(4) A low-dielectric film including the low-dielectric resin composition as defined in any one of the above aspects (1) to (3).
(5) A process for producing the low-dielectric resin composition as defined in any one of the above aspects (1) to (3).
(6) A coating agent for low-dielectric films including the hollow silica particles as defined in any one of the above aspects (1) to (3), and a matrix resin-forming material in which the hollow silica particles are dispersed.

DETAILED DESCRIPTION OF THE INVENTION

The present invention relates to a low-dielectric resin composition having sufficiently low dielectric constant and dissipation factor, a low-dielectric film formed of the low-dielectric resin composition, processes for producing the low-dielectric resin composition and the low-dielectric film, and a coating agent for low-dielectric films.

The present inventors have found that the above conventional problems can be solved by dispersing hollow silica particles having a specific structure in a matrix resin.

More specifically, the present invention relates to the following aspects [1] to [9]:
[1] A low-dielectric resin composition including hollow silica particles having an average particle size of from 0.05 to 3 μm and a BET specific surface area of less than 30 $m^2/g$, and a matrix resin in which the hollow silica particles are dispersed.
[2] A low-dielectric resin composition including hollow silica particles having an average particle size of from 0.05 to 1 μm with the proviso that 80% by mass or more of the whole particles have a particle size falling within the range of the average particle size ±30%, and a BET specific surface area of less than 30 $m^2/g$, and a matrix resin in which the hollow silica particles are dispersed.

[3] A low-dielectric resin composition including hollow silica particles having an average particle size of from 0.05 to 3 µm, a porosity of from 30 to 90% and a BET specific surface area of less than 30 m$^2$/g, and a matrix resin in which the hollow silica particles are dispersed.

[4] A low-dielectric film including the low-dielectric resin composition as defined in any one of the above aspects [1] to [3].

[5] A process for producing the low-dielectric resin composition as defined in any one of the above aspects [1] to [3], including the following steps (I) to (III):

Step (I): preparing hollow silica particles (A) containing air inside thereof or core/shell type silica particles (B) in which a material capable of being dissipated by calcination to form hollow portions therein is encapsulated;

Step (II); calcination the hollow silica particles (A) or the core/shell type silica particles (B) obtained in the step (I) at a temperature higher than 950° C. to prepare hollow silica particles (C); and Step (III); dispersing the hollow silica particles (C) obtained in the step (II) in a matrix resin-forming material to prepare a dispersion of the particles.

[6] A process for producing a low-dielectric film, including, in addition to the steps (I) to (III) as defined above, the following step (IV);

Step (IV): applying the dispersion obtained in the step (III) onto a substrate and then solidifying the applied dispersion.

[7] A coating agent for low-dielectric films including hollow silica particles having an average particle size of from 0.05 to 3 µm and a BET specific surface area of less than 30 m$^2$/g, and a matrix resin-forming material in which the hollow silica particles are dispersed.

[8] A coating agent for low-dielectric films including hollow silica particles having an average particle size of from 0.05 to 1 µm with the proviso that 80% by mass or more of the whole particles have a particle size falling within the range of the average particle size ±30%, and a BET specific surface area of less than 30 m$^2$/g, and a matrix resin-forming material in which the hollow silica particles are dispersed.

[9] A coating agent for low-dielectric films including hollow silica particles having an average particle size of from 0.05 to 3 µm, a porosity of from 30 to 90% and a BET specific surface area of less than 30 m$^2$/g, and a matrix resin-forming material in which the hollow silica particles are dispersed.

[Low-Dielectric Resin Composition and Low-Dielectric Film]

The first low-dielectric resin composition according to the present invention is characterized by including hollow silica particles having an average particle size of from 0.05 to 3 µm and a BET specific surface area of less than 30 m$^2$/g, and a matrix resin in which the hollow silica particles are dispersed, and the low-dielectric film according to the present invention is characterized by including such a low-dielectric resin composition.

The second low-dielectric resin composition according to the present invention is characterized by including hollow silica particles having an average particle size of from 0.05 to 1 µm with the proviso that 80% by mass or more of the whole particles have a particle size falling within the range of the average particle size ±30%, and a BET specific surface area of less than 30 m$^2$/g, and a matrix resin in which the hollow silica particles are dispersed, and the low-dielectric film according to the present invention is characterized by including such a low-dielectric resin composition.

The third low-dielectric resin composition according to the present invention is characterized by including hollow silica particles having an average particle size of from 0.05 to 3 µm, a porosity of from 30 to 90% and a BET specific surface area of less than 30 m$^2$/g, and a matrix resin in which the hollow silica particles are dispersed. Also, the low-dielectric film according to the present invention is characterized by including such a low-dielectric resin composition.

The low-dielectric resin composition and the low-dielectric film according to the present invention contain hollow silica particles having the above specific structure in a dispersed state to thereby contemplate reduction in dielectric constant and dissipation factor thereof. The reason therefor is considered to be that since no matrix resin is allowed to be present in hollow portions of the hollow silica particles, the porosity of the resin composition is not lowered so that a molded product and a film obtained from the resin composition is reduced in dielectric constant and dissipation factor.

For example, as measured at a frequency of 1 MHz, the dielectric constant of the low-dielectric film is preferably 3.5 or less, more preferably 3.2 or less, still more preferably 3.0 or less and especially preferably from 1.5 to 3.0. Meanwhile, the dielectric constant may be measured by an ordinary method such as an electrode contact method and an electrode non-contact method using an LCR meter, an impedance analyzer, etc.

Also, for example, as measured under the conditions described in Examples below, the dissipation factor of the low-dielectric film is preferably 0.01 or less, more preferably 0.0095 or less and still more preferably 0.009 or less.

The thickness of the low-dielectric film is not particularly limited. From the viewpoints of facilitated production and exhibition of a low dielectric constant, the low-dielectric film preferably has a thickness of from 10 to 700 µm, more preferably from 30 to 500 µm and still more preferably from 50 to 300 µm.

[Hollow Silica Particles]

The hollow silica particles used in the present invention include [1] hollow silica particles having an average particle size of from 0.05 to 3 µm and a BET specific surface area of less than 30 m$^2$/g (hereinafter occasionally referred to merely as "hollow silica particles [1]"); [2] hollow silica particles having an average particle size of from 0.05 to 1 µm with the proviso that 80% by mass or more of the whole particles have a particle size falling within the range of the average particle size ±30%, and a BET specific surface area of less than 30 m$^2$/g (hereinafter occasionally referred to merely as "hollow silica particles [2]"); and [3] hollow silica particles having an average particle size of from 0.05 to 3 µm, a porosity of from 30 to 90% and a BET specific surface area of less than 30 m$^2$/g (hereinafter occasionally referred to merely as "hollow silica particles [3]"). These hollow silica particles [1] to [3] are hereinafter comprehensively referred to merely as "hollow silica particles" or "hollow silica particles (C)".

The average particle size of the hollow silica particles [1] may be appropriately controlled in view of applications thereof, etc. The number-average particle size of the hollow silica particles [1] is preferably from 0.1 to 3 µm, more preferably from 0.15 to 2.5 µm and still more preferably from 0.2 to 2.2 µm.

The average particle size of the hollow silica particles [2] may also be appropriately controlled in view of applications thereof, etc. The number-average particle size of the hollow silica particles [2] is preferably from 0.1 to 1 µm, more preferably from 0.15 to 0.9 µm and still more preferably from 0.2 to 0.8 µm.

The average particle size of the hollow silica particles [3] may also be appropriately controlled in view of applications thereof, etc. The number-average particle size of the hollow silica particles [3] is preferably from 0.1 to 2.7 μm, more preferably from 0.15 to 2.5 μm and still more preferably from 0.2 to 2.2 μm.

When using the resin composition of a thin film shape, the hollow silica particles therein preferably have a smaller average particle size. The number-average particle size of the hollow silica particles used in the thin film-shaped resin composition is preferably from 0.05 to 1 μm, more preferably from 0.1 to 0.9 μm and still more preferably from 0.2 to 0.8 μm.

On the other hand, in the case where plural kinds of hollow silica particles have the same porosity, the hollow silica particles having a larger average particle size are expected to exhibit a higher strength. From such a viewpoint, the number-average particle size of the hollow silica particles is preferably from 1 to 3 μm, more preferably from 1 to 2.7 μm and still more preferably from 1 to 2.5 μm.

When using the resin composition of a thin film shape, preferably 80% by mass or larger, more preferably 85% by mass or larger, still more preferably 90% by mass or larger and especially preferably 95% by mass or larger of the whole hollow silica particles used therein have a particle size which falls within the range of the average particle size ±30%. Thus, it is desirable that the hollow silica particles are formed from a group of particles having a very uniform particle size.

In addition, from the viewpoints of improved dielectric characteristics, etc., the porosity of the hollow silica particles is preferably from 30 to 90%, more preferably from 35 to 85% and still more preferably from 38 to 80%.

The BET specific surface area of the hollow silica particles is preferably 25 m$^2$/g or less, more preferably 20 m$^2$/g or less and still more preferably 18 m$^2$/g or less from the viewpoints of stable retention of contents encapsulated therein, etc.

When subjected to a powder X-ray diffraction (XRD) measurement, the hollow silica particles preferably exhibit a diffraction pattern in which no peaks are observed at a diffraction angle (2θ) corresponding to a crystal lattice spacing (d) of less than 1 nm.

Also, the hollow silica particles preferably have a pore size distribution in which substantially no pores having a pore size of 1 nm or larger are present. The average thickness of an outer shell portion of the hollow silica particles is preferably smaller as long as it lies within the range capable of maintaining a strength of the hollow silica particles as a carrier. The average diameter (average volume) of hollow portions of the hollow silica particles is preferably larger from the viewpoint of encapsulating a larger amount of contents therein. From these viewpoints, the average thickness of an outer shell portion of the hollow silica particles is usually from 0.5 to 500 nm, preferably from 2 to 400 nm and still more preferably from 3 to 300 nm.

The ratio of the average thickness of the outer shell portion to the average particle size of the hollow silica particles [(average thickness of outer shell portion)/(average particle size of hollow silica particles)] is usually from 0.01 to 0.9, preferably from 0.05 to 0.8 and more preferably from 0.1 to 0.7.

The average particle size of the hollow silica particles and the average thickness of the outer shell portion thereof may be appropriately controlled according to production conditions of the hollow silica particles (A) as a raw material, a particle size of the hollow portion-forming material, calcination conditions, etc.

[Process for Producing Low-Dielectric Resin Composition]

The process for producing the low-dielectric resin composition according to the present invention is not particularly limited. However, the process preferably includes the following steps (I) to (III) from viewpoint of efficiently producing the resin composition.

Step (I): preparing hollow silica particles (A) containing air inside thereof (hereinafter occasionally referred to merely as "hollow silica particles (A)") or core/shell type silica particles (B) in which a material capable of being dissipated by calcination to form hollow portions therein is encapsulated (hereinafter occasionally referred to merely as "core/shell type silica particles (B)");

Step (II): calcination the hollow silica particles (A) or the core/shell type silica particles (B) obtained in the step (I) at a temperature higher than 950° C. to prepare hollow silica particles (C); and Step (III): dispersing the hollow silica particles (C) obtained in the step (II) in a matrix resin-forming material to prepare a dispersion of the particles.

In the following, the details of the steps (I) to (III) as well as respective components used therein are explained.

Step (I)

In the step (I), the hollow silica particles (A) or the core/shell type silica particles (B) are prepared. The step (I) is not particularly limited as long as the hollow silica particles (A) or the core/shell type silica particles (B) can be suitably produced. The step (I) preferably further includes the following step A to D.

Step A: preparing an aqueous solution containing 0.1 to 50 g/L of polymer particles (a-1) or 0.1 to 100 mmol/L of a hydrophobic organic compound (a-2), 0.1 to 100 mmol/L of at least one compound (b) selected from the group consisting of quaternary ammonium salts represented by the following general formulae (1) and (2), and 0.1 to 100 mmol/L of a silica source (c) capable of forming a silanol compound by hydrolysis thereof:

$[R^1(CH_3)_3N]^+X^-$  (1), and

$[R^1R^2(CH_3)_2N]^+X^-$  (2)

wherein $R^1$ and $R^2$ are each independently a linear or branched alkyl group having 4 to 22 carbon atoms; and $X^-$ is a monovalent anion;

Step B: stirring the aqueous solution prepared in the step A at a temperature of from 10 to 100° C. to prepare a water dispersion of proto-core/shell type silica particles (i.e., core/shell type silica precursor particles) each having an outer shell portion formed of silica and a core portion formed of the polymer particles (a-1) or the hydrophobic organic compound (a-2);

Step C: separating the core/shell type silica particles (B) from the water dispersion obtained in the step B; and Step D: calcination the core/shell type silica particles (B) thus obtained in the step C to obtain the hollow silica particles (A).

In the following, the steps A to D are explained in more detail.

[Step A]

(Polymer Particles (a-1))

The polymer particles (a-1) used in the step A are preferably particles of at least one polymer selected from the group consisting of a cationic polymer, a nonionic polymer and an amphoteric polymer. As the polymer, a substantially water-insoluble polymer is preferably used.

The average particle size of the polymer particles used in the steps A to D is preferably from 0.02 to 1 μm, more preferably from 0.05 to 0.9 μm, still more preferably from 0.1 to 0.8 μm, and especially preferably from 0.12 to 0.7 μm for the purpose of obtaining the compound having a very small particle size and a uniform particle size distribution which are features of the hollow silica particles used in the present invention. In addition, preferably 80% by mass or larger, more preferably 85% by mass or larger, still more preferably 90% by mass or larger and especially preferably 95% by mass or larger of the whole polymer particles have a particle size which falls within the range of the average particle size ±30%. Thus, it is desirable that the polymer particles are formed from a group of particles having a very uniform particle size.
(Cationic Polymer)

The cationic polymer used in the present invention is preferably dispersible in a medium containing an aqueous continuous phase in the form of a polymer emulsion in the presence of a cationic surfactant. The cationic polymer is preferably obtained by subjecting a monomer mixture containing a cationic monomer, in particular, a cationic group-containing ethylenically unsaturated monomer, to emulsion polymerization in the presence of a cationic surfactant by known methods.

Examples of the cationic monomer include an acid-neutralized product of an amino group-containing monomer and a quaternary ammonium salt obtained by quaternarization of the above monomer using a quaternarizing agent.

Specific examples of the preferred cationic monomer include dialkylamino group- or trialkyl ammonium group-containing (meth)acrylates. Among these monomers, most preferred are dialkylamino group- or trialkyl ammonium group-containing (meth)acrylates.

Meanwhile, the term "(meth)acrylate" as used herein means an acrylate, a methacrylate and both thereof.

The cationic polymer used in the present invention contains a constitutional unit derived from the above cationic monomer and preferably contains, in addition to the constitutional unit derived from the above cationic monomer, a constitutional unit derived from a hydrophobic monomer, in particular, an alkyl (meth)acrylate or an aromatic ring-containing monomer. Examples of the suitable hydrophobic monomer include alkyl (meth)acrylates containing an alkyl group having 1 to 30 carbon atoms, preferably 3 to 22 carbon atoms and more preferably 3 to 18 carbon atoms, styrene-based monomers such as styrene and 2-methyl styrene, aryl esters of (meth)acrylic acid such as benzyl (meth)acrylate, vinyl monomers containing an aromatic group having 6 to 22 carbon atoms, and vinyl acetate. Among these hydrophobic monomers, most preferred are alkyl (meth)acrylates and styrene.

Meanwhile, the hydrophobic monomer as used herein means a polymerizable organic compound having a low solubility in water which is capable of forming a separate phase from water. Examples of the hydrophobic monomer include compounds having a Log P value of 0 or more, and preferably 0.5 or more but 25 or less. The "Log P value" as used herein means a logarithm of a 1-octanol/water partition coefficient of a chemical substance, and is expressed by a numerical value calculated by fragment approach according to SRC's LOGKOW/KOWWIN Program. More specifically, a chemical structure of the chemical substance is divided into constitutional fragments, and hydrophobic fragment constants of the respective fragments are accumulated to obtain the Log P value (refer to Meylan, W. M. and P. H. Howard, 1995, "Atom/fragment contribution method for estimating octanol-water partition coefficients", J. Pharm. Sci., 84: pp. 83-92).

The cationic polymer may contain the constitutional unit derived from the cationic monomer in a small amount. Therefore, most of constitutional units of the cationic polymer may be formed from the constitutional unit derived from the hydrophobic monomer. The total content of the constitutional unit derived from the cationic monomer and the constitutional unit derived from the hydrophobic monomer in the cationic polymer is from 70 to 100% by mass, preferably from 80 to 100% by mass and still more preferably from 95 to 100% by mass. In particular, the weight ratio of the constitutional unit derived from the cationic monomer to the constitutional unit derived from the hydrophobic monomer [(constitutional unit derived from cationic monomer)/(constitutional unit derived from hydrophobic monomer)] is preferably from 0.001 to 0.5, more preferably from 0.002 to 0.3 and still more preferably from 0.003 to 0.1 from the viewpoint of a good particle forming property.
(Nonionic Polymer)

The nonionic polymer as used herein means a polymer incapable of exhibiting an electric charge in an aqueous solution thereof. The nonionic polymer is a polymer derived from an electrically unchargeable monomer, i.e., a nonionic monomer, and may be obtained by polymerizing the nonionic monomer by known methods such as an emulsion polymerization method, an emulsifier-free polymerization method, etc.

As the nonionic monomer, there may be used the hydrophobic monomers as previously described (in paragraphs [0015] and [0016]) with respect to the cationic polymer. Examples of the suitable nonionic monomer include one or more compounds selected from the group consisting of alkyl (meth)acrylates containing an alkyl group having 1 to 30 carbon atoms, preferably 3 to 22 carbon atoms and more preferably 3 to 18 carbon atoms, vinyl acetate and styrene.

Specific examples of the nonionic polymer include polystyrene, ethyl acrylate-ethyl methacrylate copolymers, ethyl acrylate-methyl methacrylate copolymers, octyl acrylate-styrene copolymers, butyl acrylate-vinyl acetate copolymers, methyl methacrylate-butyl acrylate-octyl acrylate copolymers, vinyl acetate-styrene copolymers, vinyl pyrrolidone-styrene copolymers and polystyrene acrylic acid resins.

Among the cationic, nonionic and amphoteric polymers, preferred are the cationic polymer and the nonionic polymer. From the viewpoint of facilitated production of the hollow silica particles (A), more preferred is the cationic polymer.

The polymer used for production of the hollow silica particles (A) is substantially water-insoluble. Such a water-insoluble polymer may be produced by a method of increasing a proportion of the hydrophobic monomer to be polymerized, or a method of cross-linking, etc.

Examples of the suitable polymer used in the present invention include a copolymer of a hydrophobic monomer selected from an alkyl (meth)acrylate and styrene with a cationic group-containing (meth)acrylate, and a nonionic polymer obtained from at least one hydrophobic monomer selected from an alkyl (meth)acrylate and styrene.

These polymers may be used alone or in the form of a mixture of any two or more thereof.

The shape and configuration of the polymer particles are not particularly limited. The size of the polymer particles may suitably vary, or the polymer particles may be formed into a spherical shape, an oval shape, etc., depending upon the aimed applications of the composite silica particles. The particle size of the hollow silica particles (A) and the volume of the hollow portions therein may be adequately controlled by varying the particle size or particle size distribution of the polymer particles.
(Hydrophobic Organic Compound (a-2))

The hydrophobic organic compound (a-2) used in the present invention means a compound having a low solubility in water and being capable of forming a separate phase from water. The hydrophobic organic compound (a-2) is preferably a compound capable of being dispersed in the presence of the above-mentioned quaternary ammonium salts. Examples of the hydrophobic organic compound (a-2) include compounds having a Log P value of 1 or more and preferably from 2 to 25.

Specific examples of the hydrophobic organic compound (a-2) include hydrocarbon compounds, ester compounds, fatty acids having 6 to 22 carbon atoms, alcohols having 6 to 22 carbon atoms and oil agents such as silicone oils, as well as various base materials for perfumes, agricultural chemicals and drugs.

When using the hydrophobic organic compound (a-2), the particle size of the hollow silica particles (A) and the volume of hollow portions therein which are influenced by a size of droplets of the hydrophobic organic compound may be adequately controlled according to a melting point of the hydrophobic organic compound, a reaction temperature, a stirring speed, a surfactant used, etc.

(Quaternary Ammonium Salt (b))

The quaternary ammonium salt (b) is used for forming the mesopores and dispersing the polymer particles (a-1) or the hydrophobic organic compound (a-2) in aqueous solution.

In the above general formulae (1) and (2), $R^1$ and $R^2$ are each independently a linear or branched alkyl group having 4 to 22 carbon atoms, preferably 6 to 18 carbon atoms and more preferably 8 to 16 carbon atoms. Examples of the alkyl group having 4 to 22 carbon atoms include various butyl groups, various pentyl groups, various hexyl groups, various heptyl groups, various octyl groups, various nonyl groups, various decyl groups, various dodecyl groups, various tetradecyl groups, various hexadecyl groups, various octadecyl groups and various eicosyl groups.

$X^-$ in the general formulae (1) and (2) is preferably at least one monovalent anion selected from the group consisting of a halogen ion, a hydroxide ion, a nitrate ion and a sulfate ion. $X^-$ is more preferably a halogen ion, and still more preferably a chlorine ion or a bromine ion.

Examples of the alkyltrimethyl ammonium salt represented by the general formula (1) include butyltrimethyl ammonium chloride, hexyltrimethyl ammonium chloride, octyltrimethyl ammonium chloride, decyltrimethyl ammonium chloride, dodecyltrimethyl ammonium chloride, tetradecyltrimethyl ammonium chloride, hexadecyltrimethyl ammonium chloride, stearyltrimethyl ammonium chloride, butyltrimethyl ammonium bromide, hexyltrimethyl ammonium bromide, octyltrimethyl ammonium bromide, decyltrimethyl ammonium bromide, dodecyltrimethyl ammonium bromide, tetradecyltrimethyl ammonium bromide, hexadecyltrimethyl ammonium bromide and stearyltrimethyl ammonium bromide.

Examples of the dialkyldimethyl ammonium salt represented by the general formula (2) include dibutyldimethyl ammonium chloride, dihexyldimethyl ammonium chloride, dioctyldimethyl ammonium chloride, dihexyldimethyl ammonium bromide, dioctyldimethyl ammonium bromide, didodecyldimethyl ammonium bromide and ditetradecyldimethyl ammonium bromide.

Among these quaternary ammonium salts (b), from the viewpoint of forming ordered mesopores, especially preferred are the alkyltrimethyl ammonium salts represented by the general formula (1), more preferred are alkyltrimethyl ammonium bromides and alkyltrimethyl ammonium chlorides, and still more preferred are dodecyltrimethyl ammonium bromide and dodecyltrimethyl ammonium chloride.

<Silica Source (c)>

The silica source (c) includes those compounds capable of producing a silanol compound by hydrolysis, such as alkoxysilanes or the like. More specifically, the silica source (c) includes compounds represented by the following general formulae (3) to (7):

$$SiY_4 \qquad (3);$$

$$R^3SiY_3 \qquad (4);$$

$$R^3_2SiY_2 \qquad (5);$$

$$R^3_3SiY \qquad (6); \text{ and}$$

$$Y_3Si-R^4-SiY_3 \qquad (7),$$

wherein $R^3$ groups are each independently an organic group having a carbon atom directly bonded to a silicon atom; $R^4$ is a hydrocarbon group having 1 to 4 carbon atoms or a phenylene group; and Y is a monovalent hydrolysable group capable of being hydrolyzed into a hydroxyl group.

In the general formulae (3) to (7), the $R^3$ groups are preferably each independently a hydrocarbon group having 1 to 22 carbon atoms in which hydrogen atoms may be partially substituted with a fluorine atom. Specific examples of $R^3$ include an alkyl group having 1 to 22 carbon atoms, preferably 4 to 18 carbon atoms, more preferably 6 to 18 carbon atoms and still more preferably 8 to 16 carbon atoms, a phenyl group and a benzyl group. $R^4$ is an alkanediyl group having 1 to 4 carbon atoms (such as a methylene group, an ethylene group, a trimethylene group, a propane-1,2-diyl group and a tetramethylene group, etc.) or a phenylene group. Y is an alkoxy group preferably having 1 to 22 carbon atoms, more preferably 1 to 8 carbon atoms and especially preferably 1 to 4 carbon atoms, or a halogen group except for fluorine.

Examples of the suitable silica source (c) include the following compounds.

Silane compounds of the general formula (3) in which Y is an alkoxy group having 1 to 3 carbon atoms, or a halogen group except for fluorine.

Trialkoxysilanes or dialkoxysilanes of the general formula (4) or (5) in which Y is an alkoxy group having 1 to 3 carbon atoms, or a halogen group except for fluorine; and $R^3$ is a phenyl group, a benzyl group, or a hydrocarbon group having 1 to 20 carbon atoms, preferably 1 to 10 carbon atoms and more preferably 1 to 5 carbon atoms in which hydrogen atoms may be partially substituted with a fluorine atom.

Monoalkoxysilanes of the general formula (6) in which Y is an alkoxy group having 1 to 3 carbon atoms, or a halogen group except for fluorine; and $R^3$ is a phenyl group, a benzyl group, or a hydrocarbon group having 1 to 20 carbon atoms, preferably 1 to 10 carbon atoms and more preferably 1 to 5 carbon atoms in which hydrogen atoms may be partially substituted with a fluorine atom.

Compounds of the general formula (7) in which Y is a methoxy group, and $R^4$ is a methylene group, an ethylene group or a phenylene group.

Among these compounds, especially preferred are tetramethoxysilane, tetraethoxysilane, phenyl triethoxysilane and 1,1,1-trifluoropropyl triethoxysilane.

The contents of the polymer particles (a-1) or the hydrophobic organic compound (a-2) (both the components are hereinafter occasionally referred to comprehensively as a "component (a)"), the quaternary ammonium salt (b) and the silica source (c) in the aqueous solution prepared in the step A are as follows.

The content of the component (a-1) in the aqueous solution is preferably from 0.1 to 50 g/L, more preferably from 0.3 to 40 g/L and especially preferably from 0.5 to 30 g/L.

The content of the component (a-2) in the aqueous solution is preferably from 0.1 to 100 mmol/L, more preferably from 1 to 100 mmol/L and especially preferably from 5 to 80 mmol/L.

The content of the component (b) in the aqueous solution is preferably from 0.1 to 100 mmol/L, more preferably from 1 to 100 mmol/L and especially preferably from 5 to 80 mmol/L. The content of the component (c) in the aqueous solution is preferably from 0.1 to 100 mmol/L, more preferably from 1 to 100 mmol/L and especially preferably from 5 to 80 mmol/L.

The order of addition of the components (a) to (c) is not particularly limited. For example, there may be adopted (i) a method in which the component (a) in the form of a suspension and the component (b) and the component (c) are sequentially charged into aqueous solution in this order while stirring; (ii) a method in which the component (a) in the form of a suspension and the component (b) and the component (c) are charged into aqueous solution at the same time while stirring; or (iii) a method in which the component (a) in the form of a suspension and the component (b) and the component (c) are charged into aqueous solution, followed by stirring the resulting aqueous solution. Among these methods, preferred is the method (i).

The aqueous solution containing the components (a) to (c) may also contain the other components including an organic compound such as methanol, an inorganic compound, etc., unless the addition thereof adversely affects formation of the proto-core/shell particles. When it is desirable to incorporate the other elements in addition to silica and the organic groups into the particles as described above, a raw metal material such as an alkoxylate and a halide containing these metals may be added during or after production of the particles.

[Step B]

In the step B, the water dispersion of the proto-core/shell type silica particles is prepared. The aqueous solution prepared in the step A is stirred at a temperature of from 10 to 100° C. and preferably from 10 to 80° C. for a predetermined time period, and then allowed to stand, so that mesopores are formed from the quaternary ammonium salt (b) and the silica source (c) on the surface of the respective polymer particles (a-1) or the hydrophobic organic compound (a-2), thereby precipitating the proto-core/shell type silica particles in which the polymer particles (a-1) or the hydrophobic organic compound (a-2) are incorporated. The stirring time of the aqueous solution may vary depending upon the temperature. The proto-core/shell type silica particles may be usually produced by stirring the aqueous solution at a temperature of from 10 to 80° C. for 0.1 to 24 h. Meanwhile, the mesopores in the proto-core/shell type silica particles obtained at this time are filled with the surfactant used upon production of the particles.

The proto-core/shell type silica particles are obtained in the form of a suspension in water. The resulting water suspension of the proto-core/shell type silica particles may be directly used as such in some applications. The proto-core/shell type silica particles are preferably separated from the suspension upon use. The proto-core/shell type silica particles may be separated from the water suspension by the methods such as filtration and centrifugal separation, etc.

In the case where the proto-core/shell type silica particles obtained in the step B contain the cationic surfactant, etc., the proto-core/shell type silica particles may be contacted with an acid solution one or plural times to remove the cationic surfactant, etc., therefrom. Examples of the acid solution used above include inorganic acids such as hydrochloric acid, nitric acid and sulfuric acid; organic acids such as acetic acid and citric acid; and solutions prepared by adding a cation exchange resin, etc., to water or ethanol. Among these acid solutions, especially preferred is hydrochloric acid. The pH of the acid solution is usually adjusted to 1.5 to 5.0.

The resulting particles obtained by removing the surfactant from the mesopores according to the above method are the proto-core/shell type silica particles which have a surface of a mesoporous structure and a large BET specific surface area, and in which the polymer particles (a-1) or the hydrophobic organic compound (a-2) are encapsulated.

[Steps C and D]

In the step C, the core/shell type silica particles (B) are separated from the water dispersion obtained in the step B, and in the step D, the core/shell type silica particles (B) obtained in the step C are calcined to obtain the hollow silica particles (A).

In the step C, the core/shell type silica particles (B) are separated from the water dispersion and then, if required, may be contacted with an acid aqueous solution and subjected to washing with water and drying. In addition, after subjected to the high-temperature treatment, in the step D, the core/shell type silica particles (B) are calcined at a temperature of preferably from 350 to 800° C. and more preferably from 450 to 700° C. for 1 to 10 h in an electric furnace, etc., to remove the polymer particles (a-1) or the hydrophobic organic compound (a-2) from an inside of the respective particles. Although the thus obtained hollow silica particles (A) have an outer shell portion having the same basic structure as that of the proto-particles, the polymer particles (a-1) or the hydrophobic organic compound (a-2) are removed from an inside thereof by calcination.

In the present invention, the core/shell type silica particles in which the polymer particles (a-1) or the hydrophobic organic compound (a-2) are encapsulated are calcined. Therefore, by preliminarily controlling the shape or configuration of the contents encapsulated in the particles, in particular, the polymer particles (a-1), as desired, it is possible to readily produce the hollow silica particles (A) having a desired shape or configuration. For example, when calcination the core/shell type silica particles in which spherical polymer particles are encapsulated, it is possible to produce the hollow silica particles (A) having a spherical inner cavity and a spherical outer contour.

Among the thus obtained hollow silica particles (A) and core/shell type silica particles (B), preferred are those particles which exhibit a powder X-ray diffraction pattern in which any peaks are observed at a diffraction angle ($2\theta$) corresponding to a lattice spacing (d) of from 1 to 12 nm.

The hollow silica particles (A) obtained in the step (I) have a mesoporous structure preferably having an average pore size of from 1 to 8 nm and more preferably from 1 to 5 nm, and 70% by mass or larger, preferably 75% by mass or larger and more preferably 80% by mass or larger of the whole hollow silica particles (A) have a mesopore size which falls within the range of the average pore size ±30%.

The hollow silica particles (A) preferably have a BET specific surface area of from 100 to 1500 $m^2/g$, more preferably from 200 to 1500 $m^2/g$ and still more preferably from 300 to 1500 $m^2/g$.

The hollow silica particles (A) preferably have an average particle size of from 0.05 to 4 μm, more preferably from 0.05 to 3.5 μm and still more preferably from 0.1 to 3.0 μm.

The average thickness of an outer shell portion (mesoporous silica portion) of the hollow silica particles is preferably smaller as long as it falls within the range capable of maintaining a strength of the hollow silica particles as a carrier. The average diameter (average volume) of hollow portions of the hollow silica particles is preferably larger from the viewpoint of encapsulating a larger amount of contents therein. From these viewpoints, the average thickness of an outer shell portion of the hollow silica particles is usually from 0.5 to 500 nm, preferably from 2 to 400 nm and still more preferably from 3 to 300 nm.

The ratio of the average thickness of the outer shell portion to the average particle size of the hollow silica particles [(average thickness of outer shell portion)/(average particle size of hollow silica particles)] is usually from 0.01 to 0.9, preferably from 0.05 to 0.8 and more preferably from 0.1 to 0.7.

The average particle size, average thickness of the outer shell portion, BET specific surface area, average pore size and powder X-ray diffraction (XRD) pattern of the hollow silica particles (A) may be measured by the methods described in Examples below.

Step (II)

In the step (II), the hollow silica particles (A) or the core/shell type silica particles (B) obtained in the step (I) are calcined at a temperature higher than 950° C. to prepare hollow silica particles (C).

The calcination temperature is preferably from 960 to 1500° C., more preferably from 970 to 1300° C. and still more preferably from 980 to 1200° C. from the viewpoints of appropriately densifying pores in the particles by calcination and controlling an average particle size and a BET specific surface area of the particles from 0.05 to 3 μm and less than 30 $m^2/g$, respectively.

The calcination may be carried out using an electric furnace, etc. The calcination time may vary depending upon the calcination temperature, etc., and is usually from 0.5 to 100 h and preferably from 1 to 80 h.

In the present invention, the hollow silica particles (A) once produced in the step (I) are calcined at a temperature higher than 950° C. in the step (II). As a result, in the step (II), it is possible to obtain the hollow silica particles (C) which have the same basic structure as that of the hollow silica particles (A) obtained in the step (I) and whose average particle size and BET specific surface area are reduced as compared to those of the hollow silica particles (A). Alternatively, the hollow silica particles (C) may also be obtained by directly calcination the core/shell type silica particles (B) obtained in the step (I) at a temperature higher than 950° C. In the present invention, among these methods, there is preferably used the method in which after once producing the hollow silica particles (A), the resulting hollow silica particles (A) are further calcined to obtain the hollow silica particles (C) having a reduced BET specific surface area.

Step (III)

In the step (III), the hollow silica particles (C) obtained in the step (II) are dispersed in a matrix resin-forming material to prepare a dispersion of the particles.

(Matrix Resin)

The matrix resin used in the present invention is not particularly limited. Examples of the matrix resin include thermosetting resins that are curable by heating, photocuring resins that are curable by irradiation with ultraviolet rays, etc., and thermoplastic resins.

Examples of the thermosetting resins and photocuring resins include epoxy resins, unsaturated polyester resins, phenol resins, urea/melamine resins, polyurethane resins, silicone resins and diallyl phthalate resins.

Specific examples of the epoxy resins include epoxy resins of various types, e.g., glycidyl ether type epoxy resins such as bisphenol A type epoxy resins, glycidyl ester type epoxy resins, glycidyl amine type epoxy resins, cyclic aliphatic type epoxy resins, novolak type epoxy resins, naphthalene type epoxy resins and dicyclopentadiene type epoxy resins.

Specific examples of the unsaturated polyester resins include unsaturated polyester resins of various types, e.g., orthophthalic acid-based polyester resins, isophthalic acid-based polyester resins, terephthalic acid-based polyester resins, alicyclic unsaturated acid-based polyester resins, aliphatic saturated acid-based polyester resins, bisphenol-based polyester resins, halogen-containing acid-based polyester resins, and halogen-containing bisphenol-based polyester resins.

Specific examples of the phenol resins include phenol resins of various types such as resol type phenol resins and novolak type phenol resins.

Examples of the thermoplastic resins include polyolefins resins, polyvinyl chloride resins, vinylidene chloride-based resins, polystyrene resins, acrylonitrile/butadiene/styrene copolymer resins, acrylonitrile/styrene copolymer resins, styrene-based block copolymer resins, methacrylic resins, polyvinyl alcohol resins, polyamide resins, polyacetal resins, polycarbonate resins, modified polyphenylene ether resins, thermoplastic polyester resins, fluororesins, polyphenylene sulfide resins, polysulfone resins, non-crystalline allylate resins, polyether imide resins, polyether sulfone resins, polyether ketone resins, liquid crystal polymer resins, polyamide imide resins, thermoplastic polyimide resins and syndiotactic polystyrene resins.

Specific examples of the polyolefins resins include polyethylene resins, polypropylene resins, a-olefin copolymer resins, polybutene-1 resins, polymethyl pentene resins, cyclic olefin-based polymer resins, ethylene/vinyl acetate copolymer resins, ethylene/methacrylic acid copolymer resins and ionomers.

Specific examples of the polyamide resins include nylon 6, nylon 66, nylon 11 and nylon 12.

Specific examples of the thermoplastic polyester resins include polyethylene terephthalate resins, polybutylene terephthalate resins, polybutylene succinate resins and polylactic acid resins.

Specific examples of the fluororesins include polytetrafluoroethylene resins, perfluoroalkoxyalkane resins, perfluoroethylene propene copolymer resins, ethylene/tetrafluoroethylene copolymer resins, polyvinylidene fluoride resins, polychlorotrifluoroethylene resins, ethylene/chlorotrifluoroethylene copolymer resins, tetrafluoroethylene/perfluorodioxole copolymer resins and polyvinyl fluoride resins.

Among the above matrix resins, preferred are thermosetting resins and photocuring resins. From the viewpoint of obtaining a low-dielectric material, more preferred are epoxy resins and phenol resins, and especially preferred are epoxy resins. These matrix resins may be used alone or in the form of a mixture of any two or more thereof.

The weight-average molecular weight of the matrix resin is preferably from 200 to 100,000 and more preferably from 500 to 10,000.

The content of the matrix resin in the low-dielectric resin composition is preferably from 30 to 98% by mass, more preferably from 40 to 95% by mass, still more preferably from 50 to 95% by mass and further still more preferably from 60 to 90% by mass from the viewpoint of allowing the low-dielectric film to exhibit a good performance.

[Process for Producing Low-Dielectric Film, and Coating Agent for Low-Dielectric Films]

The process for producing the low-dielectric film according to the present invention includes, in addition to the above steps (I) to (III), the following step (IV).

Step (IV): applying the dispersion obtained in the step (III) onto a substrate and then solidifying the applied dispersion.

Meanwhile, the "matrix resin-forming material" as used herein means a material having a fluidity which is solidified under predetermined conditions to form a matrix resin. For example, as the matrix resin-forming material, there may be mentioned liquid resin materials before curing the thermosetting resins or photocuring resins, thermoplastic resin materials that are kept in a fluidized state by heating, resin solutions prepared by dissolving the thermoplastic resin materials in a volatile solvent, and precursor materials before polymerized or polymerization intermediates of thermoplastic resins.

The low-dielectric film of the present invention in which a thermosetting resin or a photocuring resin is used as the matrix resin may be produced by the method of dispersing the hollow silica particles (C) in an uncured liquid resin material as the matrix resin-forming material, and then curing and solidifying the matrix resin-forming material.

In addition, the low-dielectric film in which a thermoplastic resin is used as the matrix resin may be produced by (1) the method of dispersing the hollow silica particles (C) in a matrix resin-forming material kept in a fluidized state by heating, and then cooling and solidifying the matrix resin-forming material; (2) the method of dispersing the hollow silica particles (C) in a solution prepared by dissolving a matrix resin-forming material in a volatile solvent, and then evaporating the solvent to solidify the matrix resin-forming material; (3) the method of dispersing the hollow silica particles (C) in a matrix resin-forming material in the form of a monomer or a polymerization intermediate, and then initiating polymerization of the matrix resin-forming material to solidify the material; (4) the method of dispersing the hollow silica particles (C) in a matrix resin-forming material during being polymerized and before solidified, and then completing polymerization of the matrix resin-forming material to solidify the material; or the like.

The first coating agent for low-dielectric films according to the present invention is in the form of a dispersion prepared by dispersing hollow silica particles having an average particle size of from 0.05 to 3 μm and a BET specific surface area of less than 30 $m^2/g$ in a matrix resin-forming material.

The second coating agent for low-dielectric films according to the present invention is in the form of a dispersion prepared by dispersing hollow silica particles having an average particle size of from 0.05 to 1 μm with the proviso that 80% by mass or more of the whole particles have a particle size falling within the range of the average particle size ±30%, and a BET specific surface area of less than 30 $m^2/g$ in a matrix resin-forming material.

The third coating agent for low-dielectric films according to the present invention is in the form of a dispersion prepared by dispersing hollow silica particles having an average particle size of from 0.05 to 3 μm, a porosity of from 30 to 90% and a BET specific surface area of less than 30 $m^2/g$ in a matrix resin-forming material.

These coating agents for low-dielectric films all are in the form of a dispersion prepared by dispersing the hollow silica particles in the matrix resin-forming material having a fluidity. When the coating agent is used as the dispersion obtained in the step (III), and applied onto a substrate and then solidified in the step (IV), it is possible to obtain the low-dielectric film as aimed by the present invention.

The substrate used in the present invention is not particularly limited. Examples of the substrate include a silicon wafer, $Si_3N_4$, a metal plate (such as Al and Pt), a glass plate. In addition, very thin substrates such as metal foils may also be used as the substrate.

The coating agent (dispersion) may be applied by an ordinary coating method such as a spin coating method, a dip coating method, a bar coating method, a spray coating method and a gravure coating method.

The coating agent applied may be solidified by drying, heating or irradiation with light.

The drying or heating conditions may vary depending upon composition or material of the resulting film structure or applications of the film. From the viewpoints of a good productivity and facilitated production of the film, the drying or heating procedure is conducted by maintaining the applied coating agent at a temperature of preferably from room temperature to 300° C., more preferably from 50 to 200° C. and still more preferably from 70 to 150° C. for a period of preferably from 0.5 to 20 days and more preferably from 1 to 10 days.

The viscosity of the matrix resin-forming material is preferably from 0.1 to 20 Pa·s, more preferably from 0.2 to 18 Pa·s, still more preferably from 1 to 16 Pa·s and especially preferably from 2 to 15 Pa·s from the viewpoints of a good performance of the low-dielectric film and an easy-dispersibility of the particles therein. Meanwhile, the viscosity of the matrix resin-forming material may be measured by the method described in Examples below.

The time required for mixing the matrix resin-forming material and the hollow silica particles is preferably as short as possible within such a range that the silica particles are apparently uniformly dispersed in the material, and is preferably from 0.1 to 60 min, more preferably from 0.5 to 10 min and still more preferably from 0.5 to 2 min. The dispersion prepared by mixing both the components is preferably applied onto the substrate as early as possible after the preparation, followed by solidifying the applied dispersion. The time period required from the preparation of the dispersion to the application thereof is preferably from 0.1 to 60 min, more preferably from 0.1 to 10 min and still more preferably from 0.1 to 2 min. Meanwhile, both the components may be uniformly mixed with each other by an ordinary method such as spatula stirring, magnetic stirring, blade stirring and homomixer stirring.

The content of the hollow silica particles in the coating agent is preferably from 10 to 70% by mass, and more preferably from 15 to 50% by mass from the viewpoints of a good coatability and a good performance of the resulting low-dielectric film. The coating agent may also contain a solvent (dispersing medium). The solvent may vary depending upon the kind of resin used, etc., and an alcohol solvent may be usually suitably used as the solvent.

The coating agent for low-dielectric films and the low-dielectric film according to the present invention may contain, in addition to the hollow silica particles, mesoporous silica particles having no hollow structure in such an amount that the effects of the present invention are not adversely affected. However, from the viewpoint of obtaining the aimed low-dielectric material, the coating agent and the low-dielectric film of the present invention preferably contain no mesoporous silica particles having no hollow structure.

In addition, the low-dielectric film and the coating agent according to the present invention may also contain known additives such as an antioxidant, a light stabilizer, an antistatic agent, a nucleating agent, a flame retardant, a plasticizer, a stabilizer, a colorant (such as a pigment and a dye), an antimicrobial agent, a surfactant, a coupling agent and a release agent.

EXAMPLES

In the following Production Examples, Examples and Comparative Examples, the term "%" represents "% by mass".

Various properties of the hollow silica particles obtained in the following Production Examples as well as various properties of the low-dielectric films obtained in the following Examples and Comparative Examples were measured by the following methods.

(1) Measurement of Powder X-ray Diffraction (XRD) Pattern of Hollow Silica Particles Using a powder X-ray diffractometer "RINT2500VPC" (tradename) available from Rigaku Co., Ltd., the powder X-ray diffraction measurement was conducted under the following conditions: X-ray source: Cu-kα; tube voltage: 40 kV; tube current: 40 mA; sampling width: 0.02°; divergence slit: ½°; vertical limitation slit: 1.2 mm; scattering slit: ½°; receiving slit: 0.15 mm. The measurement was performed by a continuous scanning method in a scanning range of a diffraction angle (2θ) of from 1 to 20° at a scanning speed of 4.0°/min. Meanwhile, a sample to be measured was crushed and then packed in an aluminum plate.

(2) Observation of Particle Shape of Hollow Silica Particles

The particle shape of the hollow silica particles was observed using a field emission type high-resolution scanning electron microscope "FE-SEM S-4000" (tradename) available from Hitachi Ltd.

(3) Measurement of Average Primary Particle Size, Average Hollow Portion Size and Average Outer Shell Thickness of Hollow Silica Particles Using a transmission electron microscope (TEM) "JEM-2100" (tradename) available from JEOL Ltd., the particles were observed at an accelerated voltage of 160 kV. More specifically, diameters, hollow portion sizes and outer shell thicknesses of whole particles appearing on five visual fields respectively containing 20 to 30 particles on a microphotograph thereof were actually measured to determine an average primary particle size, an average hollow portion size and an average outer shell thickness of the particles. Further, the proportion (% by mass) of the particles having a particle size falling within the range of the average particle size ±30% based on the whole particles was calculated. Meanwhile, upon the above observation, a specimen used for the measurement was prepared by attaching a sample material onto a Cu mesh "200-A Mesh" (available from Okenshoji Co., Ltd.) with a high resolution carbon supporting membrane and then removing an excessive amount of the sample material by blowing.

(4) Measurement of BET Specific Surface Area and Average Pore Size of Hollow Silica Particles Using a specific surface area/pore size distribution measuring device "ASAP2020" (tradename) available from Shimadzu Corp. the BET specific surface area of a sample was measured by a multipoint method using liquid nitrogen to derive the value within the range where a parameter C was positive. The derivation of the BET specific surface area was carried out according to a BJH method, and an average pore size of the sample was determined from the peak top. The sample was pretreated at 250° C. for 5 h.

(5) Measurement of Dielectric Constant and Dissipation Factor

A mixture prepared by kneading hollow silica particles and a resin was applied onto a PET film, and then heated and cured. Then, the cured resin composition was peeled off from the film, and cut into a bar shape to prepare a sample. In an alternative method, a casting mold was prepared by forming a groove having a width of 2 mm, a depth of 1.5 mm and a length of 120 mm on a Teflon (registered trademark) resin. The mixture prepared by kneading hollow silica particles and a resin was cast into the mold and then heated and cured. After cooling, the cured sample was taken out from the mold. Both the samples prepared by the above methods had the same electrical properties.

The above prepared samples were subjected to measurement of a dielectric constant and a dissipation factor thereof by a cavity resonator perturbation method at 1 MHz or 5.8 GHz using a PNA microwave network analyzer "E8361A" (10 MHz to 67 GHz) available from Agilent Technologies, Inc., connected to a dielectric constant measuring device (resonator: 5.8 GHz) available from Kanto Electronic Application and Development Inc.

The sample having a dielectric constant of 3.5 or less and a dissipation factor of 0.01 or less was regarded as a low-dielectric film having a sufficient insulating performance.

(6) Measurement of Porosity of Hollow Silica Particles

The porosity (%) of the hollow silica particles was calculated from density values measured with helium and nitrogen as measuring gases by using "ULTRA PYCNOMETER 1000" available from QUANTACHROME Corp., according to the following formula.

Porosity (%)=(Density measured with nitrogen gas)/(Density measured with helium gas)×100

(7) Calculation of Volume Ratio of Air in Resin Composition

The volume ratio (%) of air in a resin composition was calculated from a compositional ratio of the resin composition, densities of the resin and silica, and the porosity of the hollow silica particles obtained in the above (6) according to the following formulae. Meanwhile, densities of the respective resins used for the calculation are as follows: epoxy resin: 1.1 g/cm$^3$; polyimide resin: 1.48 g/cm$^3$; silica framework: 2.2 g/cm$^3$.

Volume of resin=(Mass ratio of resin)×(Density of resin)

Volume of silica outer shell=(Mass ratio of silica)×(Density of silica)

Volume of air=(Volume of silica outer shell)×Porosity/(1−Porosity)

Volume ratio (%) of air in resin composition=(Volume of air)/[(Volume of resin)+(Volume of silica outer shell)+(Volume of air)]

Production Example 1

Production of Hollow Silica Particles (1)

A 20 L reaction vessel was charged with 16 kg of water, 66 g of 25% tetramethyl ammonium hydroxide, 68 g of dodecyltrimethyl ammonium bromide and 192 g of cationic acrylic polymer particles ("FINESPHERE FS-501" (tradename) available from Nippon Paint Co., Ltd.; average particle size: 500 nm), and the contents of the reaction vessel were stirred to prepare an aqueous solution. To the thus obtained aqueous solution were slowly added 68 g of tetramethoxysilane, and the resultant mixture was stirred at room temperature (25° C.) for 5 h, and then aged for 12 h.

Next, the resulting white precipitate was filtered out by passing the reaction solution through a 0.2 μm-mesh membrane filter, and then washed with 10 L of water, and further dried at a temperature of 100° C. for 5 h, thereby obtaining dried core/shell type silica particles each having a core portion formed of the polymer particles and a shell portion formed of the silica particles.

The thus obtained dried particles were heated to 600° C. at a temperature rise rate of 1° C./min while flowing air therethrough (at a rate of 3 L/min) using a high-speed heating electric furnace "SK-2535E" (tradename) available from Motoyama Co., Ltd., and calcined at 600° C. for 2 h to remove organic components therefrom, thereby obtaining hollow silica particles. Fifty grams of the thus obtained hollow silica particles were transferred into an alumina crucible, and calcined in air at 1000° C. for 72 h using the above electric furnace.

The results of measurement of various properties of the hollow silica particles (1) after calcined are as follows.

The hollow silica particles had an average primary particle size of 480 nm; an average hollow portion size of 400 nm; an average outer shell thickness of 40 nm; and a BET specific surface area of 15 m²/g.

Among the whole hollow silica particles, 99.9% by mass thereof had a particle size falling within the range of the average particle size ±30%.

In the measurement of an average pore size of the hollow silica particles, it was confirmed that no peaks were observed in the range of 1 nm or more.

In the powder X-ray diffraction measurement, it was confirmed that the hollow silica particles exhibited a diffraction pattern in which no peaks were observed at a diffraction angle (2θ) corresponding to a crystal lattice spacing (d) of less than 1 nm.

Production Example 2

Production of Hollow Silica Particles (2)

A 20 L reaction vessel was charged with 4 kg of methanol, 33 g of 25% tetramethyl ammonium hydroxide, 68 g of dodecyltrimethyl ammonium bromide and 40 g of hexane, and the contents of the reaction vessel were stirred and dissolved to prepare a methanol solution. To the thus obtained methanol solution were added 12 kg of ion-exchanged water over 70 s, thereby precipitating emulsified droplets of hexane. The obtained reaction solution was stirred for 120 s, and then 68 g of tetramethoxysilane were slowly added thereto. The resultant mixture was stirred at room temperature (25° C.) for 5 h, and then aged for 12 h.

Next, the resulting white precipitate was filtered out by passing the reaction solution through a filter paper (5C) available from Advantec Toyo Kaisha, Ltd., and then washed with 10 L of water, and further dried at a temperature of 100° C. for 5 h, thereby obtaining dried silica particles.

The thus obtained dried particles were heated to 600° C. at a temperature rise rate of 1° C./min while flowing air therethrough (at a rate of 3 L/min) using a high-speed heating electric furnace "SK-2535E" (tradename) available from Motoyama Co., Ltd., and calcined at 600° C. for 2 h to remove organic components therefrom, thereby obtaining hollow silica particles. Fifty grams of the thus obtained hollow silica particles were transferred into an alumina crucible, and calcined in air at 1000° C. for 72 h using the above electric furnace.

The results of measurement of various properties of the hollow silica particles (2) after calcined are as follows.

The hollow silica particles had an average particle size of 847 nm; an average hollow portion size of 615 nm; an average outer shell thickness of 116 nm; a BET specific surface area of 8 m²/g; and a porosity of 40%.

Among the whole hollow silica particles, 90% by mass thereof had a particle size falling within the range of the average particle size ±30%.

In the measurement of an average pore size of the hollow silica particles, it was confirmed that no peaks were observed in the range of 1 nm or more.

In the powder X-ray diffraction measurement, it was confirmed that the hollow silica particles exhibited a diffraction pattern in which no peaks were observed at a diffraction angle (2θ) corresponding to a crystal lattice spacing (d) of less than 1 nm.

Production Example 3

Production of Hollow Silica Particles (3)

The same procedure as in Production Example 2 was repeated except that the time of adding the ion-exchanged water was 300 s, and the stirring time until adding tetramethoxysilane was 300 s, thereby obtaining hollow silica particles (3).

The results of measurement of various properties of the hollow silica particles (3) after calcined are as follows.

The hollow silica particles had an average particle size of 1317 nm; an average hollow portion size of 955 nm; an average outer shell thickness of 181 nm; a BET specific surface area of 4 m²/g; and a porosity of 40%.

Among the whole hollow silica particles, 90% by mass thereof had a particle size falling within the range of the average particle size ±30%.

In the measurement of an average pore size of the hollow silica particles, it was confirmed that no peaks were observed in the range of 1 nm or more.

In the powder X-ray diffraction measurement, it was confirmed that the hollow silica particles exhibited a diffraction pattern in which no peaks were observed at a diffraction angle (2θ) corresponding to a crystal lattice spacing (d) of less than 1 nm.

Example 1

The hollow silica particles (1) obtained in Production Example 1 were weighed in an amount of 0.6 g, and kneaded with 1.4 g of a matrix resin obtained by mixing a bisphenol A type epoxy resin (available from Japan Epoxy Resins Co., Ltd.; liquid type; grade: 828 (dimer to trimer); viscosity: 12 to 15 Pa·s (25° C.); epoxy equivalent: 184 to 194), an epoxy resin curing agent (available from Japan Epoxy Resins Co., Ltd.; acid anhydride grade; YH306) and a curing accelerator (available from Japan Epoxy Resins Co., Ltd.; 2-ethyl-4(5)-methyl imidazole; grade: EMI24) at a weight ratio of 5:6:0.05, thereby producing a low-dielectric resin composition. The thus obtained composition was cast into the above Teflon (registered trademark) mold, and then heated at 80° C. for 3 h in an electric dryer, followed by further heating and curing the composition at 120° C. for 6 h. After cooling, the resulting test sample was taken out from the mold and subjected to measurement of a dielectric constant and a dissipation factor thereof. The results are shown in Table 1.

Example 2

The same procedure as in Example 1 was repeated except that the amounts of the hollow silica particles and the matrix resin were changed to 0.8 g and 1.2 g, respectively, thereby producing a low-dielectric resin composition and preparing a test sample.

Comparative Example 1

The same procedure as in Example 1 was repeated except that no hollow silica particles were used, thereby producing a low-dielectric resin composition and preparing a test sample.

Comparative Example 2

The same procedure as in Example 1 was repeated except for using the hollow silica particles (specific surface area: 1200 m$^2$/g) which were produced only by calcination the dried particles at 600° C. for 2 h in Production Example 1, thereby producing a low-dielectric resin composition and preparing a test sample.

Example 3

The hollow silica particles obtained in Production Example 1 were weighed in an amount of 0.6 g, and kneaded with 7 g of a polyimide resin (available from Ube Industries, Ltd.; tradename: "U-Varnish S"; solid content: 20%), thereby producing a low-dielectric resin composition. The thus obtained composition was cast into the above Teflon (registered trademark) mold, and then heated at 200° C. for 10 min in an electric dryer. The obtained sample was taken out from the mold, and further heated at 450° C. for 10 min in a calcination furnace, thereby preparing a test sample. The thus obtained test sample was subjected to measurement of a dielectric constant and a dissipation factor thereof. The results are shown in Table 1.

Comparative Example 3

The same procedure as in Example 3 was repeated except that no hollow silica particles were used, thereby producing a low-dielectric resin composition and preparing a test sample.

obtained in Examples 1 and 2. In addition, the low-dielectric resin composition of Example 3 which contained the polyimide resin as the matrix resin had a dielectric constant of 2.99 and a dissipation factor of 0.0015, whereas the low-dielectric resin composition of Comparative Example 3 which contained no hollow silica particles had a dielectric constant of 3.7 and a dissipation factor of 0.0017 which were higher than those of the composition obtained in Example 3.

From the above results, it was confirmed that the low-dielectric resin compositions containing the hollow silica particles obtained in Examples according to the present invention apparently exhibited practically effective low dielectric constant and low dissipation factor as compared to the resin composition of Comparative Example 1 or 3 which contained no hollow silica particles, and as compared to the resin composition of Comparative Example 2 which contained the hollow silica particles having a high specific surface area.

Example 4

The hollow silica particles (2) obtained in Production Example 2 were weighed in an amount of 0.6 g, and kneaded with 1.4 g of a matrix resin obtained by mixing a bisphenol A type epoxy resin (available from Japan Epoxy Resins Co., Ltd.; liquid type; grade: 828 (dimer to trimer); viscosity: 12 to 15 Pa·s (25° C.); epoxy equivalent: 184 to 194), an epoxy resin curing agent (available from Japan Epoxy Resins Co., Ltd.; acid anhydride grade; YH306) and a curing accelerator (available from Japan Epoxy Resins Co., Ltd.; 2-ethyl-4(5)-methyl imidazole; grade: EMI24) at a weight ratio of 5:6:0.05, thereby producing a low-dielectric resin composition. The thus obtained composition was cast into the above Teflon (registered trademark) mold, and then heated at 80° C. for 3 h in an electric dryer, followed by further heating and curing the composition at 120° C. for 6 h. After cooling, the resulting test

TABLE 1

|  | Ex. 1 | Ex. 2 | Com. Ex. 1 | Com. Ex. 2 | Ex. 3 | Com. Ex. 3 |
| --- | --- | --- | --- | --- | --- | --- |
| Resin | Epoxy resin | Epoxy resin | Epoxy resin | Epoxy resin | Polyimide resin | Polyimide resin |
| Content of hollow silica particles (%) | 30 | 40 | — | 30*[1] | 30 | — |
| Dielectric constant (1 MHz) | 2.31 | 2.29 | 2.65 | 2.63 | 2.99 | 3.7 |
| Dissipation factor | 0.0078 | 0.0068 | 0.0112 | 0.0129 | 0.0015 | 0.0017 |

Note
*[1]Calcined at 600° C.; specific surface area: 1200 m$^2$/g.

As recognized from Table 1, the low-dielectric resin compositions of Examples 1 and 2 which contained the hollow silica particles and the epoxy resin as the matrix resin had dielectric constants of 2.31 and 2.29, respectively, and dissipation factor of 0.0078 and 0.0068, respectively, whereas the low-dielectric resin composition of Comparative Example 1 which contained no hollow silica particles had a dielectric constant of 2.65 and a dissipation factor of 0.0112 which were higher than those of the compositions obtained in Examples 1 and 2. Further, the low-dielectric resin composition of Comparative Example 2 which contained the hollow silica particles having a specific surface area as high as 1200 m$^2$/g also had a dielectric constant of 2.63 and a dissipation factor of 0.0129 which were also higher than those of the compositions sample was taken out from the mold and subjected to measurement of a dielectric constant and a dissipation factor thereof. The results are shown in Table 2.

Example 5

The same procedure as in Example 4 was repeated except that the hollow silica particles (3) obtained in Production Example 3 were used in place of the hollow silica particles (2) obtained in Production Example 2, thereby producing a low-dielectric resin composition and preparing a test sample.

Comparative Example 4

The same procedure as in Example 4 was repeated except that no hollow silica particles (2) obtained in Production Example 2 were used, thereby producing a low-dielectric resin composition and preparing a test sample.

TABLE 2

|  | Ex. 4 | Ex. 5 | Com. Ex. 4 |
|---|---|---|---|
| Resin | Epoxy resin | Epoxy resin | Epoxy resin |
| Content of hollow silica particles (%) | 30 | 30 | — |
| Dielectric constant (5.8 GHz) | 2.42 | 2.42 | 2.65 |
| Dissipation factor | 0.0086 | 0.0082 | 0.0112 |

As recognized from Table 2, the low-dielectric resin compositions of Examples 4 and 5 which contained the hollow silica particles and the epoxy resin as the matrix resin had the same dielectric constant of 2.42, and dissipation factor of 0.0086 and 0.0082, respectively, whereas the low-dielectric resin composition of Comparative Example 4 which contained no hollow silica particles had a dielectric constant of 2.65 and a dissipation factor of 0.0112 which were higher than those of the compositions obtained in Examples 4 and 5.

From the above results, it was confirmed that the low-dielectric resin compositions containing the hollow silica particles obtained in Examples according to the present invention apparently exhibited practically effective low dielectric constant and low dissipation factor as compared to the resin composition of Comparative Example 4 which contained no hollow silica particles.

INDUSTRIAL APPLICABILITY

In accordance with the present invention, there are provided a low-dielectric resin composition having sufficiently low dielectric constant and dissipation factor, a low-dielectric film formed of the low-dielectric resin composition, and processes for producing the low-dielectric resin composition and the low-dielectric film, as well as a coating agent for low-dielectric films.

What is claimed is:

1. A low-dielectric resin composition, comprising hollow silica particles having an average particle size of from 0.05 to 2.2 μm and a BET specific surface area of less than 30 m$^2$/g, and a matrix resin in which the hollow silica particles are dispersed.

2. A low-dielectric resin composition comprising hollow silica particles having an average particle size of from 0.05 to 1 μm with the proviso that 80% by mass or more of the whole particles have a particle size falling within the range of the average particle size ±30%, and a BET specific surface area of less than 30 m$^2$/g, and a matrix resin in which the hollow silica particles are dispersed.

3. A low-dielectric resin composition, comprising hollow silica particles having an average particle size of from 0.05 to 2.2 μm, a porosity of from 30 to 90% and a BET specific surface area of less than 30 m$^2$/g, and a matrix resin in which the hollow silica particles are dispersed.

4. The low-dielectric resin composition according to claim 1, wherein when subjected to powder X-ray diffraction measurement, the hollow silica particles exhibit a diffraction pattern in which no peaks are observed at a diffraction angle (2θ) corresponding to a crystal lattice spacing (d) of less than 1 nm.

5. The low-dielectric resin composition according to 1, wherein a content of the hollow silica particles in the composition is from 10 to 60% by mass.

6. The low-dielectric resin composition according to claim 3, wherein a volume ratio of air in the resin composition is from 3 to 60%.

7. A low-dielectric film comprising a low-dielectric resin composition as defined in claim 1.

8. A process for producing a low-dielectric resin composition as defined in claim 1, comprising:
preparing hollow silica particles (A) comprising air inside thereof or core/shell silica particles (B) in which a material capable of being dissipated by calcination to form hollow portions therein is encapsulated;
calcining the hollow silica particles (A) or the core/shell type silica particles (B) obtained in said preparing at a temperature higher than 950° C. to prepare hollow silica particles (C); and
dispersing the hollow silica particles (C) obtained in said calcining in a matrix resin-forming material to prepare a dispersion of the particles.

9. The process for producing a low-dielectric film according to claim 8, further comprising
applying the dispersion obtained in said dispersing onto a substrate and then solidifying the applied dispersion.

10. The process for producing a low-dielectric film according to claim 8, wherein the matrix resin-forming material has a viscosity of from 0.1 to 20 Pa's.

11. A coating agent for low-dielectric films, comprising hollow silica particles having an average particle size of from 0.05 to 2.2 μm and a BET specific surface area of less than 30 m$^2$/g, and a matrix resin-forming material in which the hollow silica particles are dispersed.

12. A coating agent for low-dielectric films comprising hollow silica particles having an average particle size of from 0.05 to 1 μm with the proviso that 80% by mass or more of the whole particles have a particle size falling within the range of the average particle size ±30%, and a BET specific surface area of less than 30 m$^2$/g, and a matrix resin-forming material in which the hollow silica particles are dispersed.

13. A coating agent for low-dielectric films, comprising hollow silica particles having an average particle size of from 0.05 to 2.2 μm, a porosity of from 30 to 90% and a BET specific surface area of less than 30 m$^2$/g, and a matrix resin-forming material in which the hollow silica particles are dispersed.

14. The low-dielectric resin composition according to claim 2, wherein when subjected to powder X-ray diffraction measurement, the hollow silica particles exhibit a diffraction pattern in which no peaks are observed at a diffraction angle (2θ) corresponding to a crystal lattice spacing (d) of less than 1 nm.

15. The low-dielectric resin composition according to claim 3, wherein when subjected to powder X-ray diffraction measurement, the hollow silica particles exhibit a diffraction pattern in which no peaks are observed at a diffraction angle (2θ) corresponding to a crystal lattice spacing (d) of less than 1 nm.

16. The low-dielectric resin composition according to claim 2, wherein a content of the hollow silica particles in the composition is from 10 to 60% by mass.

17. The low-dielectric resin composition according to claim 3, wherein a content of the hollow silica particles in the composition is from 10 to 60% by mass.

18. A process for producing the low-dielectric resin composition as defined in claim 2, comprising:
preparing hollow silica particles (A) comprising air inside thereof or core/shell silica particles (B) in which a material capable of being dissipated by calcination to form hollow portions therein is encapsulated;

calcining the hollow silica particles (A) or the core/shell type silica particles (B) obtained in said preparing at a temperature higher than 950° C. to prepare hollow silica particles (C); and dispersing the hollow silica particles (C) obtained in said calcining in a matrix resin-forming material to prepare a dispersion of the particles.

19. The process for producing a low-dielectric film according to claim 18, further comprising:

applying the dispersion obtained in said dispersing onto a substrate and then solidifying the applied dispersion.

20. A process for producing the low-dielectric resin composition as defined in claim 3, comprising:

preparing hollow silica particles (A) comprising air inside thereof or core/shell silica particles (B) in which a material capable of being dissipated by calcination to form hollow portions therein is encapsulated;

calcining the hollow silica particles (A) or the core/shell type silica particles (B) obtained in said preparing at a temperature higher than 950° C. to prepare hollow silica particles (C); and dispersing the hollow silica particles (C) obtained in said calcining in a matrix resin-forming material to prepare a dispersion of the particles.

21. The process for producing a low-dielectric film according to claim 20, further comprising:

applying the dispersion obtained in said dispersing onto a substrate and then solidifying the applied dispersion.

22. The low-dielectric resin composition according to claim 1, wherein 80% by mass or more of all of said particles have a particle size falling within the range of the average particle size ±30%.

\* \* \* \* \*